(12) United States Patent
Miller (10) Patent No.: US 8,109,547 B1
(45) Date of Patent: Feb. 7, 2012

(54) APPARATUS AND METHOD FOR COLLECTING ANIMAL DROPPINGS

(75) Inventor: Frank Miller, Secaucus, NJ (US)

(73) Assignee: DD & FM, LLC, South Hackensack, NJ (US)

( * ) Notice: Subject to any disclaimer, the term of this patent is extended or adjusted under 35 U.S.C. 154(b) by 109 days.

(21) Appl. No.: 12/584,296

(22) Filed: Sep. 2, 2009

Related U.S. Application Data (60) Provisional application No. 61/190,934, filed on Sep. 3, 2008.

(51) Int. Cl.
*A01K 29/00* (2006.01)

(52) U.S. Cl. .......................... 294/1.5; 294/1.4

(58) Field of Classification Search ............ 294/1.3–1.5, 294/55; 15/257.1, 257.3, 257.4, 257.7, 257.9; 248/95, 99; 43/11, 12
See application file for complete search history.

(56) References Cited

U.S. PATENT DOCUMENTS

| | | | | |
|---|---|---|---|---|
| 1,214,450 A * | 1/1917 | Gifford | ............................ | 56/337 |
| 2,653,403 A * | 9/1953 | Oslund | ............................ | 43/11 |
| 4,003,595 A * | 1/1977 | Fano et al. | ...................... | 294/1.5 |
| 4,193,624 A * | 3/1980 | Kerr | ................................ | 294/1.5 |
| 4,272,906 A * | 6/1981 | Liebling | ............................ | 43/11 |
| 4,335,678 A * | 6/1982 | Garza et al. | .................... | 294/1.5 |
| 5,033,781 A * | 7/1991 | Flood | ............................. | 294/1.4 |
| 5,276,995 A * | 1/1994 | Johnson | ............................ | 43/11 |
| 6,880,284 B2 * | 4/2005 | Horgan | ............................ | 43/11 |
| 7,204,532 B2 * | 4/2007 | Lefevre | ........................... | 294/1.5 |

* cited by examiner

*Primary Examiner* — Paul T Chin
(74) *Attorney, Agent, or Firm* — Lawrence G. Fridman (57) ABSTRACT

A pet sanitation device comprises a frame, an elongated handle and an adjusting assembly. The frame includes a receiving bottom area receiving one part of a bag opening. A closing arrangement is provided for receiving another portion of the bag opening. The adjusting assembly is movably supported on the handle and includes a control member slidable along the handle and a transition element having distal and proximal ends thereof. The distal end is associated with the closing arrangement. In operation, upon slidable movement of the control member, the transition element is activated and the closing arrangement is moved within the frame to convert the bag opening from open to closed position and vise versa.

19 Claims, 7 Drawing Sheets

APPARATUS AND METHOD FOR COLLECTING ANIMAL DROPPINGS

THIS NON-PROVISIONAL APPLICATION CLAIMS PRIORITY UNDER 35 USC 119(e) OF U.S. PROVISIONAL APPLICATION Ser. No. 61/190,934 FILED BY Frank Miller on Sep. 3, 2008.

FIELD OF THE INVENTION

This invention relates in general to pet sanitary devices and more particularly, to a device adapted for sanitary disposal of animal waste without contaminating the device and hands of user.

BACKGROUND OF THE INVENTION

With the increasing number of urban and suburban households having pets, and particularly dogs, local government authorities have enacted ordinances requiring owners to clean up after pets in order to reduce pedestrian hazards and increase public enjoyment of outdoor recreational facilities.

There are many devices known to assist owners in cleaning up their pet's waste. However, many such devices are often unsanitary and only partially effective. These devices which include scoops for shoveling, tongs for grasping waste material, etc. need daily cleaning and leave the remainder of the animal's waste which often spreads over the surfaces of streets, walkways, parks, etc. In using many of the prior art devices, hands of the pet owner become contaminated when cleaning after dogs is required. In such instances, hands have to be washed or disinfected. Understandably so, this often causes substantial inconvenience. Obviously, if the pet owner walks away without cleaning up the animal waste, he or she could be fined by proper authorities Furthermore, it is difficult to thoroughly pick up the pet waste once deposited on the ground by the devices described above. Thus, there will be some remains left behind making it unclean, and the environmental pollution upon using such devices, cannot be eliminated. Particularly, it is difficult to pick up waste left on the grass and other uneven surfaces. In view of the above, conventional devices are not popular among pet owners.

Thus, it has been long felt and unsolved need to provide a simple and reliable device for picking up animal waste in its entirety, so as to minimize chance of injury to a pet and to eliminate contact between the waste hand of the owner, the device itself, etc.

SUMMARY OF THE INVENTION

One aspect of the invention provides a pet sanitation device which consists of a frame having a generally looped-shaped configuration including a receiving bottom area adapted to receive and hold at least one part of an opening of a bag, a closing arrangement adapted to receive at least another portion of the bag opening. The closing arrangement is movable within the frame. An elongated handle is provided having one end connected to the frame. An adjusting assembly is movably supported by the elongated handle and comprises at least a control member slidable along the elongated handle and a transition element having a distal and proximal end thereof, with the proximal end being associated with a control member and a distal end being associated with a closing arrangement. In operation upon slidable movement of the control member, the closing arrangement is moved within a frame, so as to convert the bag opening from the open to closed position and vise versa.

As to another aspect of the invention, the closing arrangement comprises a bar positioned transversely to a longitudinal axis of the frame and movable within the frame in the direction along the longitudinal axis. The bar is adapted for receiving the other portion of the bag opening. The transition element can be formed having Y-shaped configuration having the distal end formed with a pair of truncated distal ends pivotably connected to the bar and a single proximal end movably attached to the control member. As to a further aspect of the invention, an upper connecting unit is provided at the lower end of the control member, so as to movably receive the proximal end of the transition element.

As to still another aspect of the invention, the elongated handle is positioned at an angle to a plane of the frame and the transition element is pivotably connected to the lower receiving end of the control member to provide transition between the longitudinal motion of the control member along the handle and longitudinal motion of the bar along the side members of the frame.

As to still further aspect of the invention, a lower connecting unit is formed at the bar of the closing arrangement and is adapted to movably receive the distal ends of the transition element. The lower connecting unit is in the form of a spaced-apart receiving plates associated with the bar. Each receiving plate movably accommodates the respective distal ends of the transition element.

BRIEF DESCRIPTION OF DRAWINGS

The preferred embodiments of the invention will hereinafter be described in conjunction with the appended drawings provided to illustrate and not to limit the invention, where like designations denote like elements, and in which.

DETAILED DESCRIPTION OF THE PREFERRED EMBODIMENT

Figure 1:
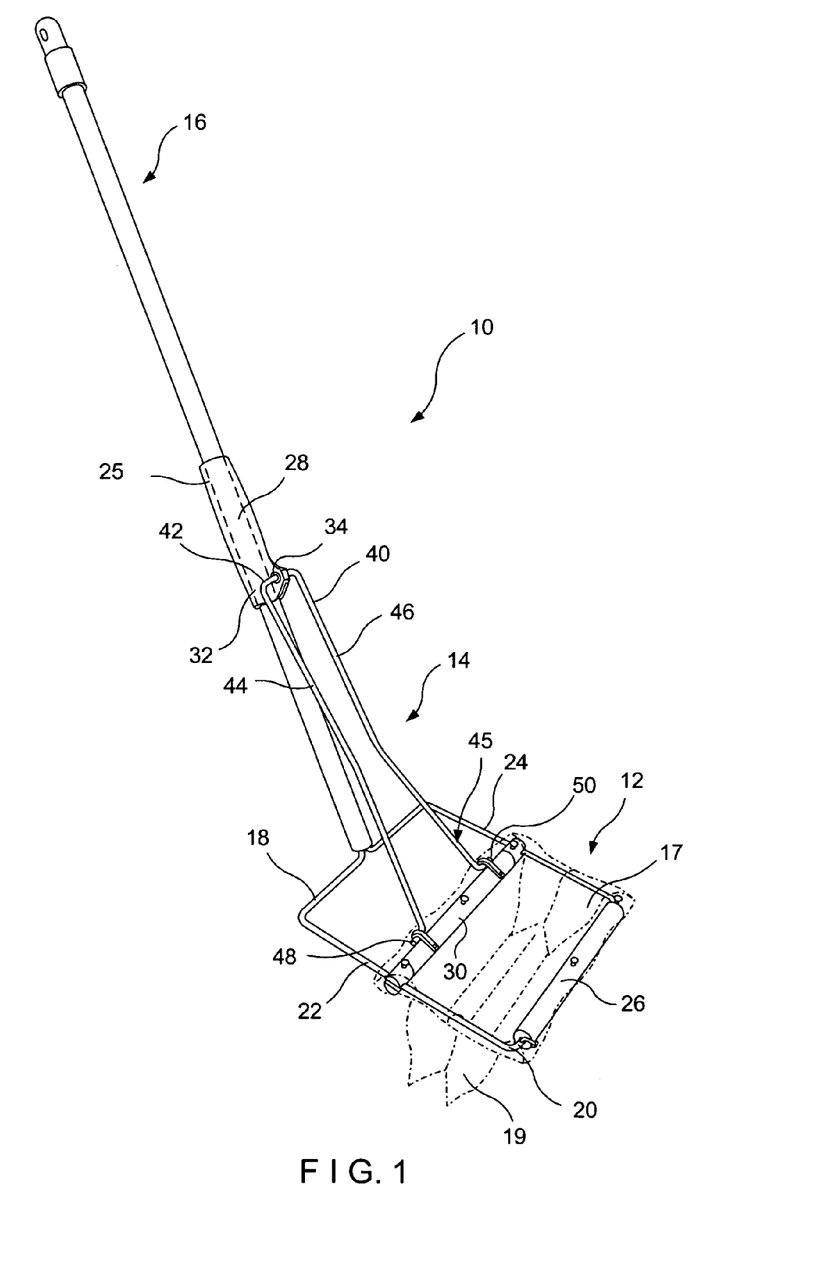
FIG. 1 is a perspective view of one embodiment of the pet sanitation device of the invention having a frame in a semi-open position and showing a bag in phantom lines.
Figure 2:
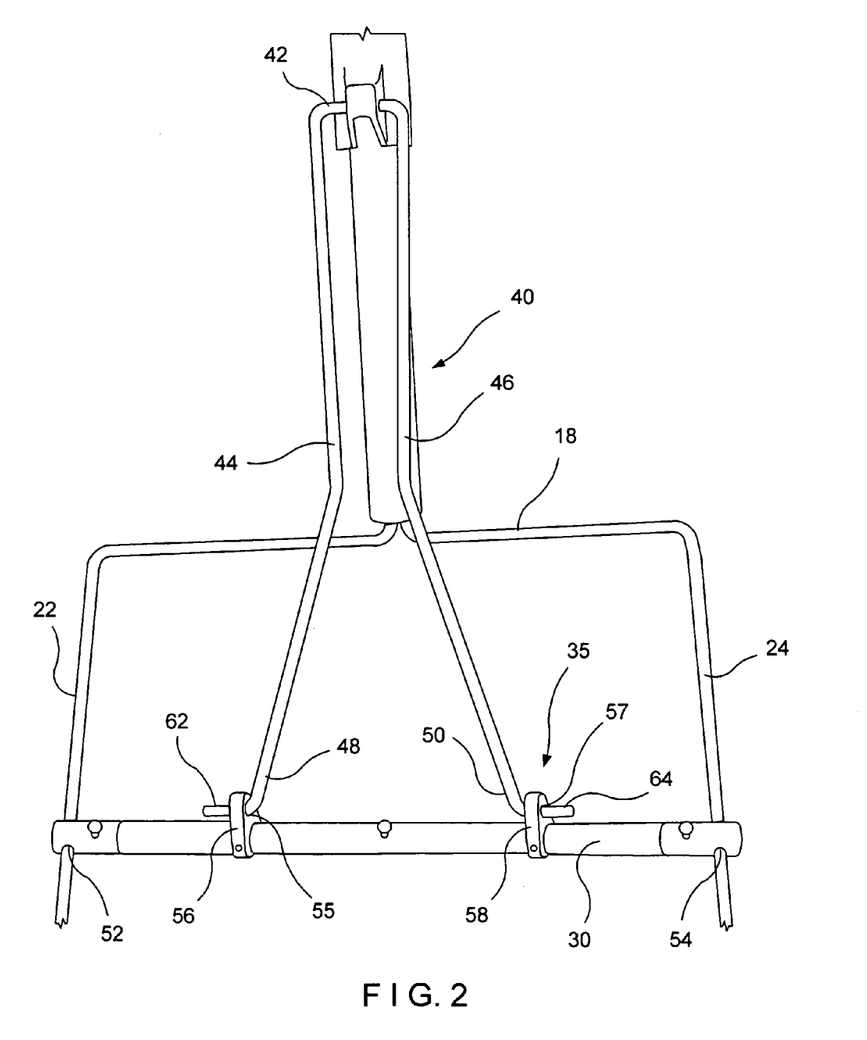
FIG. 2 is a partial enlarged view showing the frame in a semi-open position and an adjusting assembly.
Figure 3:
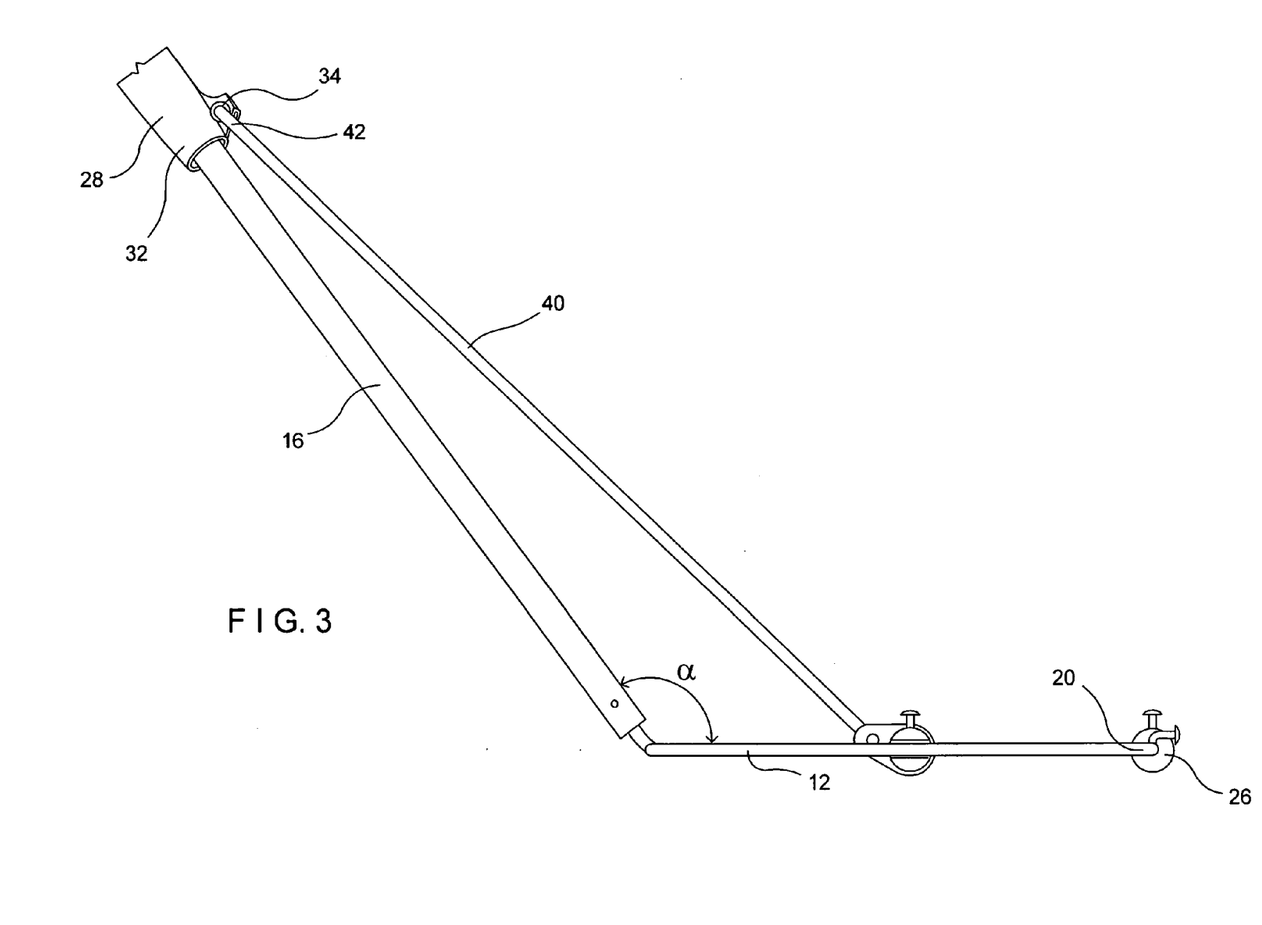
FIG. 3 is a side elevational view showing the frame positioned at an angle to the handle.
Figure 4:
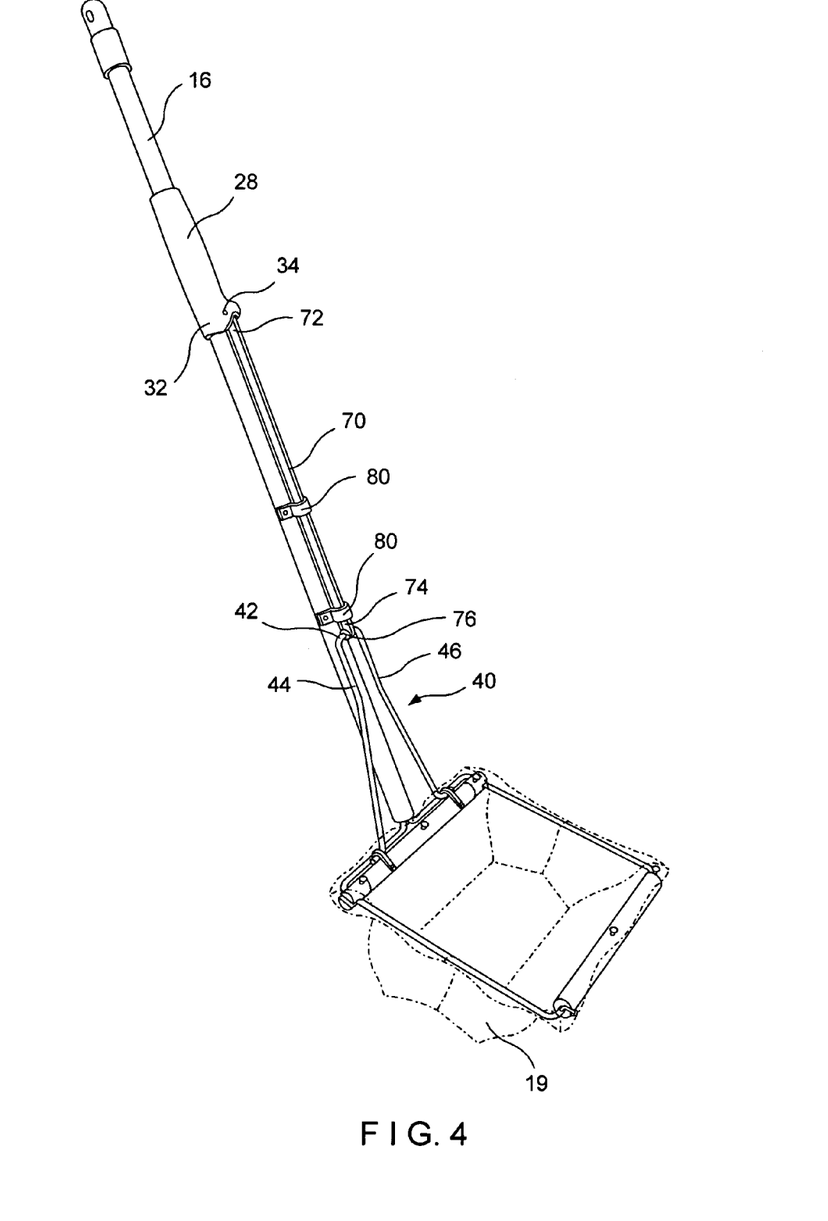
FIG. 4 is a perspective view of another embodiment of the pet sanitation device with a connector being provided between the control member and the transition element showing a frame in an open position.
Figure 5:
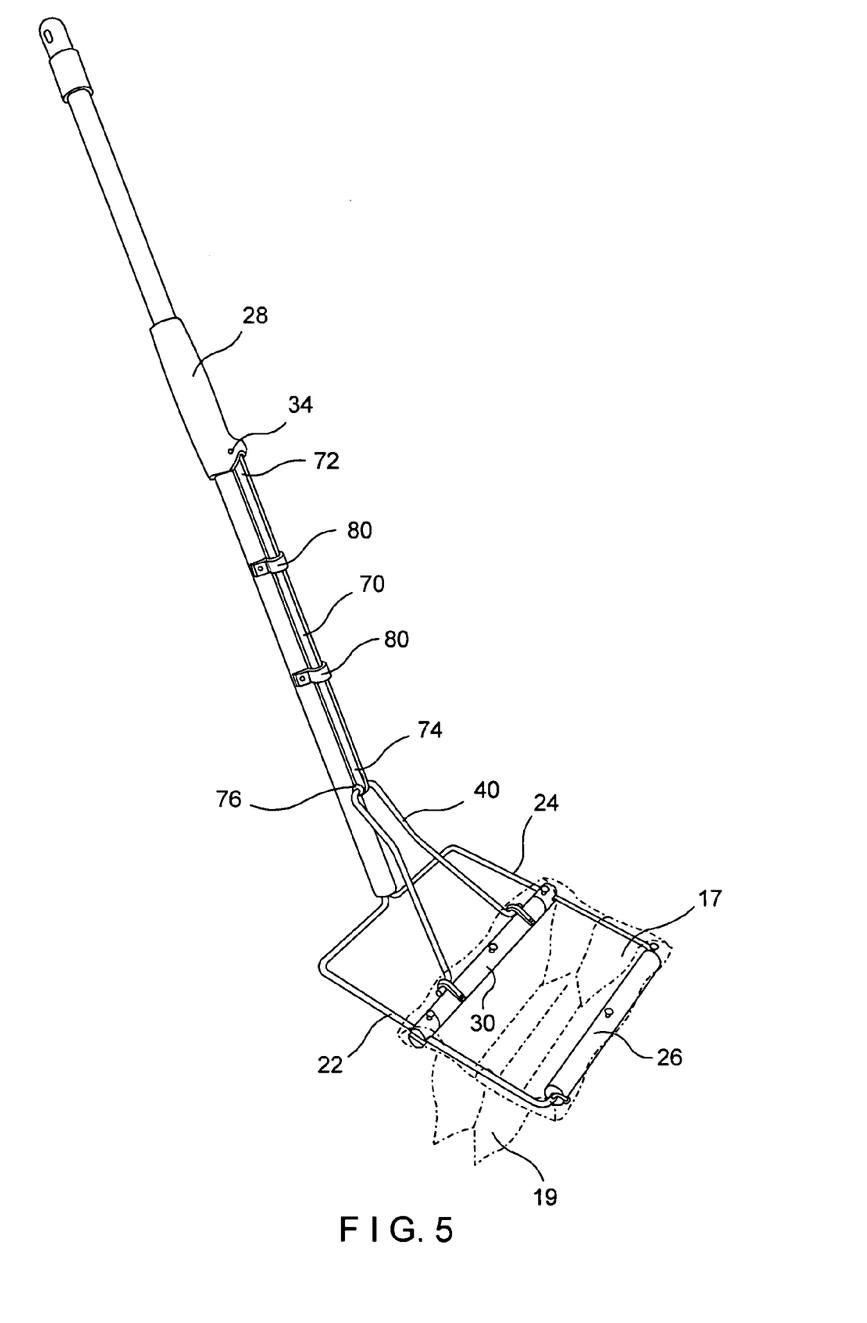
FIG. 5 is a perspective view showing the pet sanitation device of FIG. 4 with a semi-closed position of the frame.
Figure 6:
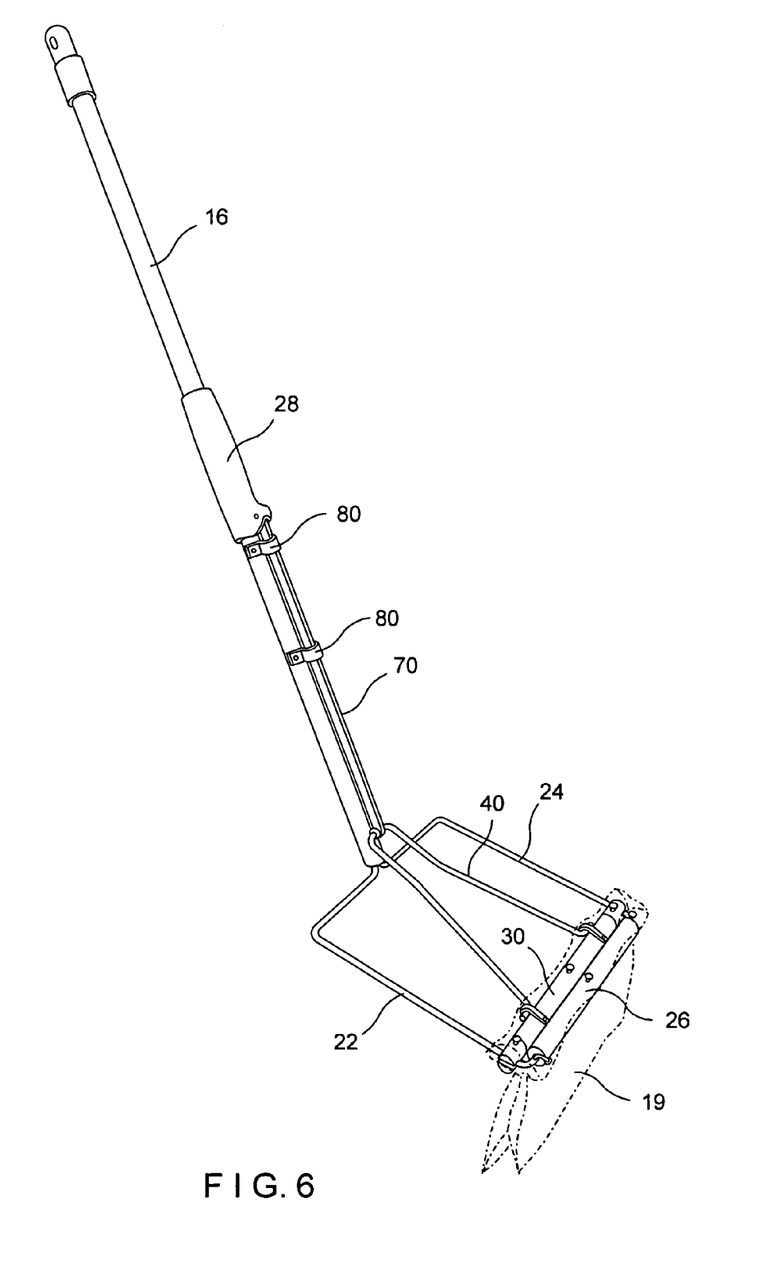
FIG. 6 is the perspective view of the pet sanitation device of FIG. 4 having the frame in the closed position.
Figure 7:
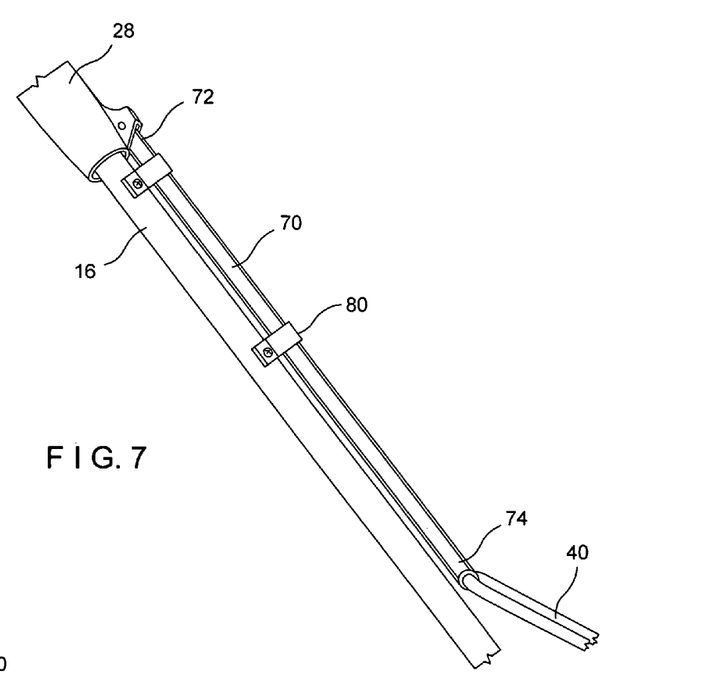
FIG. 7 is an enlarged partial view showing the connector positioned between the control member and a proximal end of the transition element.
Figure 8:
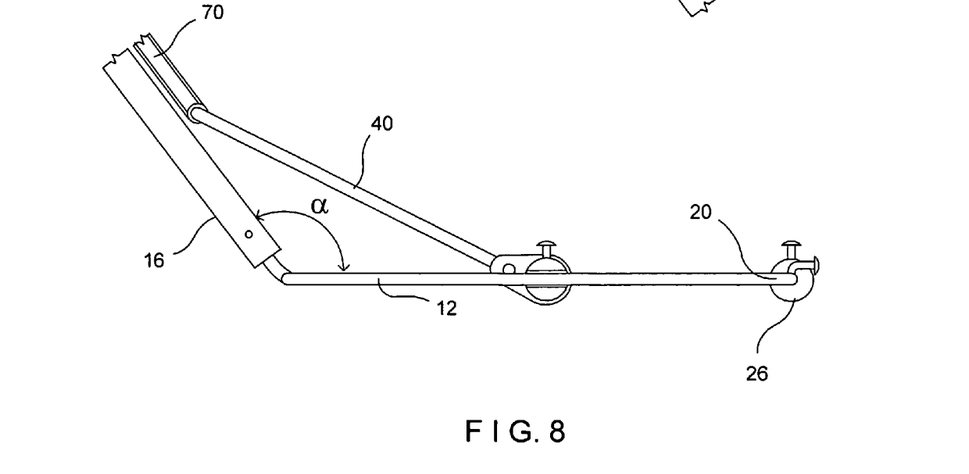
FIG. 8 is a partial side elevational view showing the transition element situated between the connector and the closing arrangement.

Referring now to the drawings in general and FIGS. 1-3 in particular wherein, the pet sanitation device 10 of the invention is illustrated. Among main elements of the device 10 of the invention are: a handle 16 having one end thereof connected to the frame 12; an adjusting arrangement 45 consisting of at least a control member 28 and a transition element 40, as well as a closing arrangement which includes a bar 30 movably associated within the frame 12.

The frame 12 includes a receiving area 26 adapted to receive and hold at least a portion of an opening 17 of a flexible waste receptacle which can be in the form of a bag 19. Closing arrangement comprising a movable elongated bar 30 is provided for receiving another portion of the bag opening. The bar 30 is movable within the frame arrangement, so as to facilitate conversion of the bag from an open to a closed position thereof and visa versa.

In the preferred embodiment, the frame 12 is formed as a four-sided hoop with a top 18 and bottom 20 portions interconnected by side members 22 and 24 which are substantially parallel to each other. The receiving area 26 is associated with the bottom portion 20. The elongated handle 16 is connected to the frame 12 and extends outwardly from the top portion 18. The elongated bar 30 is formed with guiding apertures 52 and 54 at each end thereof adapted for slidable engagement with substantially parallel side members 22 and 24 of the frame. The bar 30 is movable along and guided by the side members.

The handle 16 can be of various lengths or configuration, but it should be long enough, so as to enable the frame 12 to reach the ground easily. In the preferred embodiment, the loop-shaped frame 12 is positioned at an angle α to the elongated handle 16. Typically, this is an obtuse angle α formed to assure a proper functionality of the device of the invention. However, use of other angles is also contemplated.

In one of the embodiments of the invention, the control member 28 is tubular-shaped having an internal opening 25 (shown in phantom lines) passing through the entire length thereof along its longitudinal axes. A tubular body of the control member 28 can be solid and uninterrupted along its lengths. However, in order to reduce weight and to minimize usage of materials, the body of the control member 28 can be formed with plural and single slots. An essential requirement however, for the control member 28, is to provide reliable guidance for the motion of the associated elements of the device 10 when it moves along the elongated handle 16.

As illustrated in the embodiments of FIGS. 1-3, an adjustment assembly 14 is movably supported on the elongated handle 16 and consists of the control member 28 slidable along the handle and a transition element 40 formed with proximal 42 and distal ends 45 thereof. The proximal end 42 is movably/pivotably associated with a lower connecting end 32 of the control member 28. In the illustrated embodiment of the invention, the transition element 40 is formed having Y-shaped configuration with a pair of the truncated distal ends 48 and 50 movably or pivotably connected to the elongated bar 30 and a single proximal end 42 movably associated with the connecting end 32 of the control member 28.

An upper connecting unit 34 is formed at the connecting end 32 of the control member 28, so as to movably accommodate the distal end 42 of the transition element 40. The upper connecting unit 34 can be in the form of a pivotable assembly or any other conventional arrangement capable of providing movable connection between the control member 28 of the transition element 40.

A lower connecting assembly 35 is formed by a spaced-apart receiving elements 56 and 58 associated with the bar 30. Each receiving element movably/pivotably receives the respective distal ends 48, 50 of the transition element 40. In the illustrated embodiment of the invention, the receiving elements 56 and 58 are in the form of spaced from each other plates having apertures 55, 57 adapted to movably receive the distal ends of the transition element. The Y-shaped transition element 40 has the distal portion 42 in the form of an elongated element arranged substantially parallel to the bar 30. Each distal end 48, 50 includes a bent portion 62, 64 which extend from side arms 44 and 46. During the assembly, each bent portion 62, 64 is inserted into the openings 55, 57 of the receiving plates. The transition element 30 can be made of a material having spring-like qualities. Prior to installation, the side arms 44, 46 are pressed together and then released for insertion of the bent portions 62, 64 into the respective apertures 55, 57 of the receiving plates. The outwardly acting spring forces are capable of keeping the bent portions of the distal ends securely within the respective apertures of the receiving plates during operation of the device.

Another embodiment of the invention with a modified adjusting arrangement adapted for use with the handle 16 having greater length, is illustrated in FIGS. 4-8. In this embodiment, a connector 70 having upper 72 and lower 74 ends is interposed between the control member 28 and the transition element 40.

The upper connecting unit 34 accommodates the upper end 72 of the connector 70. The intermediate connecting unit 76 is provided at the lower end 74 of the connector 70 to movably accommodate the distal end 42 the transition element 30. In this embodiment, the upper connecting unit 34 can be in the form of rigid assembly or any other conventional arrangement capable of accommodating connection between the control member 28 and the connector 70. A movable connection between the control member 28 and the connector 70 is also contemplated. The receiving end 32 of the control member 28 is formed with a receiving slot or opening adapted to properly accommodate the upper end 72 of the connector.

In the embodiment of FIGS. 4-8, in order to provide proper guidance for the connector 70 during its longitudinal motion along the handle 16, single or multiple guiding units 80 are provided. The guiding units 80 can be formed as of a loop having ends thereof attached to the handle 16 and formed with a guiding opening/aperture accommodating slidable motion of the connector 70. Numerous spaced-apart guiding units 80 are provided along the length of the handle 16 so as to assure proper guidance for the movement of the connector 70 along the handle.

In the embodiment of FIGS. 1-3, an essential function of the upper connecting unit 34 is to accommodate a rotational/pivotal movement of the proximal end 42 of the transition element 40 at the connecting end 32 of the control member 28. A plastic bushing or any other arrangement for reducing friction can be provided within the aperture at the connecting end 32 of the control member 28 to movably receive the proximal end 42 of the transition element 40. It should be noted however, that any conventional means of accommodating the movable connection between the control member 28 and the transition element 30 is within the scope of the invention.

In the embodiment of FIGS. 4-8, where the connector 70 is interposed between the control member 20 and the transition element 40, the intermediate connecting unit is provided at the lower end 74 of the connector, so as to movably accommodate the proximal end 42 of the transition element. The structure and function of this connecting unit is similar to that discussed hereinabove.

An essential function of the movable connection between the proximal end 42 of the transition element 40 and either the control member 40 or connector 70 is to provide a transition between the longitudinal motion of the control member 28 and/or the connector 70 along the elongated handle 16 and the motion of the bar 30 of the closing arrangement along side elements 22 and 24 of the frame 12, wherein the handle is positioned at an angle to the plane of the frame.

In the embodiments of FIGS. 1-3, during the motion of the control member 28 and connector 70 on the handle 16, the distal end 42 of the transition element 40 is movably received within the receiving unit 34 in such a manner that such motion is translated into either upward or downward motion of the transition element 40. This motion is in turn translated into the longitudinal motion of the bar 30 within the frame 12. In this manner, upon downward motion of the control member 28, the distal ends of the transition element 40 are movably or pivotably moved within the lower connecting assembly 35. As this motion continues, the distal ends 48, 50 of the transition element through their pivotal/movable association with the receiving plates 56, 58 push the bar 30 along the side members 22, 24 of the frame towards the receiving area 26 thereof. Since one end of the opening 17 of the bag or waste receptacle is attached to the bar 30 and the other end of the opening 17 is attached to the receiving area 26, such motion of the bar 30 results in the closure of the bag.

In order to place the device of the invention in the retracted position or to open the bag, the control member 28 is moved upwardly on the handle 16, so that the transition element 40 through its association with the receiving plates 56, 58 pulls the bar 30 along the side members 22, 24 of the frame away from the receiving area 26 and the bag opening 17 is converted from its closed to an open position.

In operation, the control member 28 is slided by a user on the elongated handle 16. This motion of the embodiment of FIGS. 4-8 through the connector 70, is transferred to the transition element 40 and to the bar 30 of the closing arrangement. Thus, upon slidable motion of the control member 28 in the downward direction, this motion through the connector 70 and the intermediate unit 76 is transferred to the transition element 40 to the bar 30 of the closing arrangement. Thus, the bar 30 with the respective portion of the bag opening 17 is moved in the direction of the receiving area 26 of the frame having another portion of the bag opening 17, so as to close the bag.

On the other hand, in order to open the bag, the control member 28 and the connector 70 are slided by the user in the direction away from the frame 12. In this motion, the bar 30 of the closing arrangement by means of the transition element 40, through the connector 70 and the intermediate unit 76, is slided away from the receiving area 26 of the frame increasing the opening therebetween.

In preparation for cleaning after a dog, a pet owner places the frame 12 in its open position by sliding the control 28 in the direction away from the frame 12, so as to move the bar 30 of the closing arrangement away from the receiving are 26. Then, one part of the bag opening 17 is attached to the receiving area 26 and the other part of the bag opening is attached to the bar 30 of the closing arrangement. When a pet is ready to defecate, the user holds the device 10 of the invention such that the frame 12 with the open bag or waste receptacle 19 is positioned beneath but spaced from the dog's anal area, so the resulted waste is caught in the bag. In use of the device of the invention, there is a minimal chance of injury to the pet. This is because the frame 12 and other parts of the device and the bag 19 are separated from the dog's body by an open space.

In preparation for the disposal of bag or receptacle containing the waste, the user merely glides the control member 28 downwardly, so as to move the bar 30 in the direction of the receiving area 26 of the frame. In this manner, various parts of the bag opening 17 are brought together to convert the bag 19 into the closed position thereof. Then the user detaches the bag from the frame 12 and disposes the bag in a trash receptacle. The whole operation of the device 10 of the invention has been performed with the hand of the user being exposed only to a clean exterior surface of the bag. This also occurs without the waste coming into a direct contact not only with the hands of the owner, but with the street or sidewalk or with any part of the device itself as well.

Because the bags or waste receptacles are typically disposed by the owner after each nature trip with a dog, a waste bag receptacle storage unit for storing a plurality of unused waste bags, can be provided. The receptacle may be positioned at any convenient location on the handle and is in the form of an enclosed area with open/close access.

What is claimed is:

1. A pet sanitation device and a pet sanitation bag in combination, comprising:
   a pet sanitation bag having an opening defined by first and second linear parts;
   a pet sanitation device comprising a frame, an elongated handle and an adjusting assembly, said frame having a generally loop-shape configuration including at least two spaced-apart substantially parallel side members and an elongated receiving bottom portion connecting said side members, said elongated receiving bottom portion is adapted to receive and hold said first part of the bag opening;
   said adjusting assembly comprising at least a control member slidable along the elongated handle and a transition element having distal and proximal ends; the proximal end of the transition element is movably associated with the control member; a closing arrangement having an elongated bar positioned transversally to a longitudinal axis of the frame and movable within the frame in the direction along said longitudinal axis, said elongated bar is adapted for receiving the second portion of the bag opening;
   said distal end of the transition element is pivotably associated with the elongated bar of the closing arrangement, so that said distal end is simultaneously involved into a pivotal motion at the elongated bar and a linear motion with the bar along the side members of the frame in direction toward and direction away from the receiving bottom portion of the frame, so that when the elongated bar approaches the elongated bottom portion of the frame the first and second portions of the bag opening approach each other closing the sanitation bag opening, and when the elongated bar is moved away from the elongated bottom portion of the frame, the first portion and the second portion of the bag opening are spaced from each other and the pet sanitation bag is opened.

2. The combination according to claim 1, wherein said transition element is formed having Y-shaped configuration, said distal end comprises a pair of truncated distal ends pivotably connected to the elongated bar and a single proximal end movably attached to the control member.

3. The combination according to claim 2, further comprising an upper connecting unit provided at a lower connecting end of the control member, so as to movably receive the proximal end of the transition element.

4. The combination according to claim 3, wherein the proximal end of the transition element is pivotable within the upper connecting unit.

5. The combination according to claim 4, wherein the elongated handle is positioned at an angle to a plane of the frame, the transition element is pivotably connected to the lower receiving end of the control member.

6. The combination according to claim 4, further comprising a lower connecting unit formed at the bar of the closing arrangement and adapted to movably receive the distal ends of the transition element.

7. The combination according to claim 6, wherein the lower connecting unit is in the form of a spaced-apart supporting plates associated with the bar, each said receiving plate movably accommodates the respective distal end of the transition element.

8. The combination according to claim 7, wherein during the longitudinal motion of the control member toward the frame, the distal end of the transition element is movable within the second receiving unit, so that the longitudinal motion of the control member is converted into the motion of the transition element which causes the longitudinal motion of the bar within the frame.

9. The combination according to claim 2, wherein said Y-shaped transition element comprises and elongated portion arranged at the proximal end thereof with side arms extending from the elongated proximal portion, each said side arm having a substantially straight portion connected to the elongated proximal portion with a distal portion extending at an angle to the straight portion, a bent portion is formed at a free end of each angle shaped distal portion.

10. The combination according to claim 9, wherein said substantially straight proximal portion is movably received within the upper connecting unit and the bent portions of the distal ends are movably associated with the plates of the closing arrangement.

11. The combination according to claim 7, wherein each said distal end of the transition element is formed by a side arm having a bent portion, said bent portions are movably received within openings provided on the supporting plates, so that upon rotational motion of the proximal end of the transition element within the upper connecting unit said bent portions through their pivotal connection with the supporting plates push the bar along the side members toward and away from the receiving bottom area of the frame.

12. The combination according to claim 1, further comprising a connector interposed between the receiving end of the control member and the proximal end of the transition element.

13. The combination according to claim 12, wherein the connector has an elongated configuration and is adapted for slidable movement along the elongated handle.

14. The combination according to claim 13, further comprising an intermediate connecting unit formed at an interface between the connector and the proximal end of the transition element.

15. The combination according to claim 14, wherein the proximal end of the transition element is movably received within the intermediate connecting unit and the distal end of the transition elements comprises a pair of distal ends pivotably connected to a pair of receiving plates associated with an elongated bar forming a part of the closing arrangement.

16. The combination according to claim 1, wherein each end of said elongated bar is provided with an opening formed for close receiving the respective side members of the frame, so as to provide guidance for movement of the elongated bar along the longitudinal axis of the frame.

17. A method for picking up animal droppings by means of an apparatus used in combination with a pet sanitation bag having an opening defined by first and second linear parts; said apparatus comprising a frame, an elongated handle and an adjusting assembly, said frame having a generally loop-shape configuration including at least two spaced-apart substantially parallel side members and an elongated receiving bottom portion connecting said side members; said adjusting assembly comprising at least a control member slidable along the elongated handle and a transition element having distal and proximal ends, the proximal end of the transition element is movably associated with the control member; a closing arrangement having an elongated bar positioned transversally to a longitudinal axis of the frame, said distal end of the transition element is pivotably attached to the elongated bar, said method comprising the steps of:
  attaching a first part of the bag opening to the elongated receiving bottom portion of the frame;
  attaching a second part of the bag opening to said elongated bar of the closing arrangement;
  slidably moving the control along the elongated handle to move the transition element and activate the closing arrangement, so that the distal end of the transition element is simultaneously involved into the pivotal motion at the elongated bar and the linear motion with the bar along the side members of the frame;
  wherein upon the elongated bar is moved away from the elongated bottom portion of the frame the first and second portions of the bag opening are spaced from each other to open the pet sanitation bag for receiving the pet droppings; and
  upon the elongated bar approaching the elongated bottom portion of the frame the first and second portions of the bag opening approach each other closing the sanitation bag opening.

18. The method according to claim 17, wherein said frame is positioned at an angle to the elongated handle and substantially parallel to a ground, so that said pet sanitation bag receives the pet droppings in a vertical direction.

19. The method according to claim 17, wherein to provide guidance for the longitudinal movement of the elongated bar within the frame each end of said elongated bar is provided with an opening formed for close receiving the respective side member of the frame.

* * * * *